US012290987B2

(12) United States Patent
Werner et al.

(10) Patent No.: US 12,290,987 B2
(45) Date of Patent: May 6, 2025

(54) ADDITIVE MANUFACTURING METHODS AND SYSTEMS

(71) Applicants: Concept Laser GmbH, Lichtenfels (DE); GE Additive Germany GmbH, Frankfurt (DE)

(72) Inventors: Juergen Werner, Lichtenfels (DE); Jan Michael Friese, Erlangen (DE); Christian Wacker, Bamberg (DE); Patrick Dueck, Weismain (DE); Kai Hertel, Breitengussbach (DE); Benedikt Roidl, Munich (DE); Dominic Graf, Weitramsdorf (DE); Florian Bechmann, Lichtenfels (DE); Johannes Stroessner, Kulmbach (DE)

(73) Assignees: Concept Laser GmbH, Lichtenfels (DE); GE Additive Germany GmbH, Frankfurt (DE)

( * ) Notice: Subject to any disclaimer, the term of this patent is extended or adjusted under 35 U.S.C. 154(b) by 136 days.

(21) Appl. No.: 18/171,985

(22) Filed: Feb. 21, 2023

(65) Prior Publication Data

US 2024/0278495 A1     Aug. 22, 2024

(51) Int. Cl.
    *B22F 10/20*          (2021.01)
    *B22F 10/22*          (2021.01)
    (Continued)

(52) U.S. Cl.
    CPC ............ *B29C 64/268* (2017.08); *B22F 10/28* (2021.01); *B22F 10/366* (2021.01); *B22F 12/45* (2021.01);
    (Continued)

(58) Field of Classification Search
    CPC .......... B22F 10/20; B22F 10/22; B22F 10/25; B22F 10/28; B22F 10/30; B22F 10/368;
    (Continued)

(56) References Cited

U.S. PATENT DOCUMENTS 7,258,720 B2    8/2007   Fuwa et al.
7,271,822 B2    9/2007   Towner
(Continued)

FOREIGN PATENT DOCUMENTS

CN    106400001 A    2/2017
CN    106670463 A    5/2017
(Continued)

OTHER PUBLICATIONS

Derahman et al., Effects of Process Parameters on Surface Quality of Parts Produce by Selective Laser Melting—ANFIS Modeling, Proceedings of Mechanical Engineering Research, May 2018, pp. 115-116.

(Continued)

*Primary Examiner* — Leo B Tentoni
(74) *Attorney, Agent, or Firm* — Wood Herron & Evans LLP

(57) ABSTRACT

Methods of additively manufacturing a three-dimensional object by one or more energy beams include selectively directing a first energy beam across a powder bed along a plurality of first hatching paths and a first contour path that defines a first outer contour portion and a first stitching portion, wherein the first outer contour portion at least partially defines a first edge portion of an outer edge of the three-dimensional object, and wherein the first edge portion is non-linear, and selectively directing a second energy beam across the powder bed along a plurality of second hatching paths and a second contour path that at least partially defines a second edge portion of the outer edge of the three-dimensional object, wherein the second edge portion is adjacent the first edge portion, and wherein the first stitching portion extends into the plurality of second hatching paths along a non-linear stitching path.

20 Claims, 8 Drawing Sheets

(51) Int. Cl.
*B22F 10/25* (2021.01)
*B22F 10/28* (2021.01)
*B22F 10/30* (2021.01)
*B22F 10/366* (2021.01)
*B22F 10/368* (2021.01)
*B22F 10/80* (2021.01)
*B22F 10/85* (2021.01)
*B22F 12/40* (2021.01)
*B22F 12/45* (2021.01)
*B22F 12/90* (2021.01)
*B28B 1/00* (2006.01)
*B29C 64/153* (2017.01)
*B29C 64/264* (2017.01)
*B29C 64/268* (2017.01)
*B29C 64/277* (2017.01)
*B29C 64/282* (2017.01)
*B29C 64/393* (2017.01)
*B33Y 10/00* (2015.01)
*B33Y 30/00* (2015.01)
*B33Y 50/02* (2015.01)
*C04B 35/64* (2006.01)
*G05B 19/4099* (2006.01)

(52) U.S. Cl.
CPC ........... *B28B 1/001* (2013.01); *B29C 64/153* (2017.08); *B29C 64/393* (2017.08); *B33Y 10/00* (2014.12); *B33Y 30/00* (2014.12); *B33Y 50/02* (2014.12); *G05B 2219/49018* (2013.01)

(58) Field of Classification Search
CPC ......... B22F 10/80; B22F 10/85; B22F 12/40; B22F 12/45; B22F 12/90; B28B 1/001; B29C 64/153; B29C 64/264; B29C 64/268; B29C 64/277; B29C 64/282; B29C 64/386; B29C 64/393; B33Y 10/00; B33Y 30/00; B33Y 50/00; B33Y 50/02; C04B 35/64; G05B 19/4099; G05B 2219/49018

USPC ...... 264/40.6, 406, 408, 409, 410, 460, 462, 264/463, 497; 425/78, 143, 174.4, 375; 219/121.65, 121.66, 121.76, 121.81, 219/121.85; 700/119

See application file for complete search history.

(56) References Cited

U.S. PATENT DOCUMENTS

| | | |
|---|---|---|
| 7,578,958 B2 | 8/2009 | Patel et al. |
| 10,338,569 B2 | 7/2019 | Crear et al. |
| 10,471,510 B2 | 11/2019 | Crear et al. |
| 10,471,665 B1 | 11/2019 | Marshall, Jr. et al. |
| 10,589,382 B2 | 3/2020 | Roerig et al. |
| 10,946,581 B2 | 3/2021 | Domrose et al. |
| 2014/0348691 A1 | 11/2014 | Ljungblad et al. |
| 2015/0064048 A1* | 3/2015 | Bessac .................. B29C 64/153 425/78 X |
| 2018/0029299 A1 | 2/2018 | Aknin et al. |
| 2018/0281112 A1 | 10/2018 | Roerig et al. |
| 2019/0232429 A1 | 8/2019 | Buller et al. |
| 2020/0180216 A1 | 6/2020 | Beck et al. |
| 2020/0298507 A1 | 9/2020 | Talgorn et al. |
| 2021/0129441 A1 | 5/2021 | Dicken et al. |
| 2021/0187830 A1 | 6/2021 | McCarthy et al. |
| 2021/0283716 A1 | 9/2021 | Werner et al. |
| 2023/0191699 A1 | 6/2023 | Rolink et al. |

FOREIGN PATENT DOCUMENTS

| | | |
|---|---|---|
| WO | WO2017143789 A1 | 8/2017 |
| WO | WO2020/174240 A1 | 9/2020 |

OTHER PUBLICATIONS

Payne, Multiple Beam Laser Diode Additive Manufacturing for Metal Parts, University of Cambridge PhD Thesis, Jul. 20, 2018, pp. 1-29. Retrieved from https://doi.org/10.17863/CAM.21469.

* cited by examiner

ADDITIVE MANUFACTURING METHODS AND SYSTEMS

FIELD

The present disclosure relates to additive manufacturing methods and systems, such as additive manufacturing methods and systems using multiple energy beams.

BACKGROUND

Three-dimensional objects may be additively manufactured using a variety of methods and systems. For example, additive manufacturing may involve a powder bed fusion process in which one or more energy beams are directed onto a powder bed to consolidate (e.g., melt, fuse, and/or sinter) sequential layers of build material such as powder material. The properties of the three-dimensional object formed by consolidating the powder material may depend at least in part on one or more parameters of the energy beam. Additionally, or in the alternative, one or more parameters of an energy beam may impact operating parameters such as processing speed of the additive manufacturing process.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
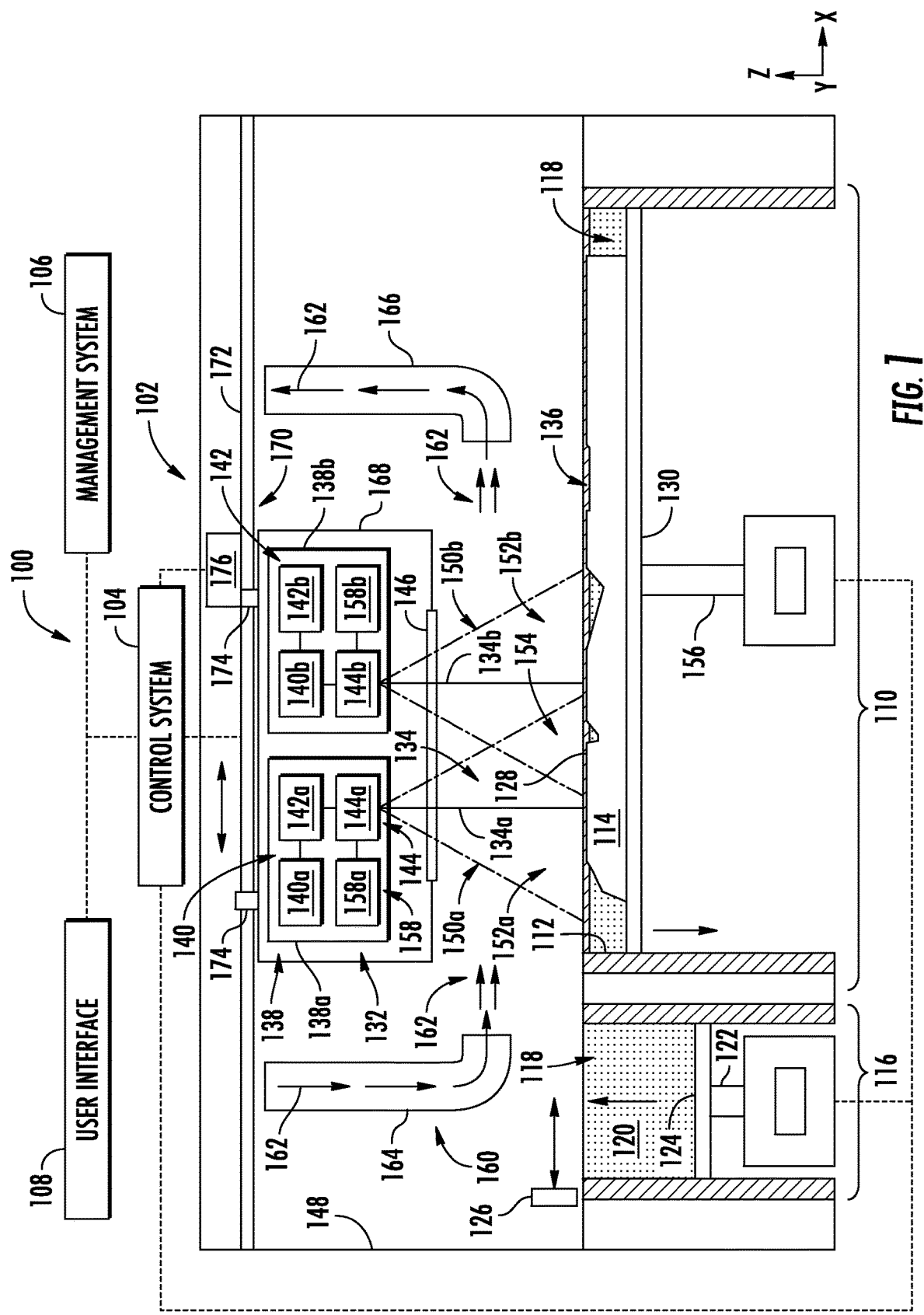
FIG. 1 schematically depicts an exemplary additive manufacturing system in accordance with one or more exemplary aspects of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed the subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, or any other suitable material that may be in solid, powder, sheet material, wire, or any other suitable form, or combinations thereof. Additionally, or in the alternative, exemplary materials may include metals, ceramics, or binders, as well as combinations thereof. Exemplary ceramics may include ultra-high-temperature ceramics, and/or precursors for ultra-high-temperature ceramics, such as polymeric precursors. Each successive layer may be, for example, between about 10 µm and 200 µm, although the thickness may be determined based on any number of parameters and may be any suitable size.

As used herein, the term "build plane" refers to a plane defined by a surface upon which an energy beam impinges to selectively irradiate and thereby consolidate powder material during an additive manufacturing process. Generally, the surface of a powder bed defines the build plane. During irradiation of a respective layer of the powder bed, a previously irradiated portion of the respective layer may define a portion of the build plane. Prior to distributing powder material across a build module, a build plate that supports the powder bed generally defines the build plane.

As used herein, the term "consolidate" or "consolidating" refers to solidification of build material (e.g., powder material) as a result of irradiating the build material, including by way of melting, fusing, sintering, or the like.

As used herein, the term "stitching path" refers to a path irradiated by an energy beam that extends from one build plane region consolidated by a first plurality of hatching paths into a second build plane region consolidated by a second plurality of hatching paths.

It is understood that terms "upstream" and "downstream" refer to the relative direction with respect to fluid flow in a fluid pathway. For example, "upstream" refers to the direction from which the fluid flows, and "downstream" refers to the direction to which the fluid flows.

It is also understood that terms such as "top", "bottom", "outward", "inward", and the like are words of convenience and are not to be construed as limiting terms.

As used herein, the terms "first", "second", and "third" may be used interchangeably to distinguish one component from another and are not intended to signify location or importance of the individual components.

The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In some additive manufacturing systems, multiple energy beams may be used to consolidate multiple build plane regions in the build plane. The multiple energy beams may be initiated from one or more energy beam sources and independently controlled via respective optical assemblies. By consolidating multiple build plane regions via different energy beams, build time of the three-dimensional object may be reduced. For example, two adjacent build plane regions may be consolidated in parallel (i.e., at least partially simultaneously) with one another to increase the overall consolidation rate of the build material.

The present disclosure generally provides additive manufacturing methods and systems, including additive manufacturing methods and systems using multiple energy beams. The presently disclosed methods and systems may provide for improved alignment and transition of the multiple energy beams in additive manufacturing methods and systems. Additionally, or in the alternative, presently disclosed methods and systems may provide for improved material properties of additively-manufactured three-dimensional objects, for example, as a result of improved alignment of the energy beam system.

Additive manufacturing systems that utilize multiple energy beams may continuously, periodically, or intermittently aligned the various energy beams to promote consolidation accuracy of the respective build plane regions. For example, proper alignment of the energy beams may ensure smooth and consistent transitions where one build plane region abuts another build plane region. Moreover, adjacent build plane regions may include an interlace region where the respective build plane regions partially overlap with one another. This interlace region may promote consistent consolidation across a larger build area of the three-dimensional object despite different energy beams consolidating the different build plane regions. However, proper transitioning between two adjacent build plane regions can still be susceptible to deviations, including along the outer contour of the three-dimensional object, such as in the case of potential misalignment of one or more energy beams.

The presently disclosed additive manufacturing systems and methods may include consolidating a first build plane region using a first energy beam travelling along a first contour path and a second build plane region using a second energy beam travelling along a second contour path. The first contour path at least partially defines a first edge portion of the three-dimensional object, which is non-linear, and the second contour path at least partially defines a second edge portion of the object. Moreover, the first contour path further includes a first stitching portion that extends into the second build plane region along a non-linear stitching path. By utilizing a non-linear stitching path within an object that has a non-linear edge, potential voids and distressed mechanical properties brought about by misalignment can be reduced or avoided. Further, the contour flexibility of non-linear stitching within an object that has a non-linear edge can enable stitching in components having complex geometries without undesired overshooting burns or excessive stitching transitions.

Accordingly, alternative additive manufacturing methods and systems would be welcomed in the art, including additive manufacturing methods and systems that provide stitching between respective build plane regions.

The presently disclosed subject matter will now be described in further detail. FIG. 1 schematically depicts an additive manufacturing system 100. The additive manufacturing system 100 may include one or more additive manufacturing machines 102. It will be appreciated that the additive manufacturing system 100 and additive manufacturing machine 102 shown in FIG. 1 is provided by way of example and not to be limiting. In fact, the subject matter of the present disclosure may be practiced with any additive manufacturing system 100 and additive manufacturing machine 102 without departing from the scope of the present disclosure. As shown, the one or more additive manufacturing machines 102 may include a control system 104. The control system 104 may be included as part of the additive manufacturing machine 102 or the control system 104 may be associated with the additive manufacturing machine 102. The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or three-dimensional objects 114 may be additively manufactured. An additive manufacturing machine 102 may include a powder module 116 that contains a supply of build material 118 (e.g., powder material) housed within a supply chamber 120. The build module 110 and/or the powder module 116 may be provided in the form of modular containers configured to be installed into and removed from the additive manufacturing machine 102 such as in an assembly-line process. Additionally, or in the alternative, the build module 110 and/or the powder module 116 may define a fixed componentry of the additive manufacturing machine 102.

The powder module 116 contains a supply of build material 118 housed within a supply chamber 120. The powder module 116 includes a powder piston 122 that elevates a powder floor 124 during operation of the additive manufacturing machine 102. As the powder floor 124 elevates, a portion of the build material 118 is forced out of the powder module 116. A recoater 126 such as a blade or roller sequentially distributes thin layers of build material 118 across a build plane 128 above the build module 110. A build platform 130 supports the sequential layers of build material 118 distributed across the build plane 128. A build platform 130 may include a build plate (not shown) secured thereto and upon which a three-dimensional object 114 may be additively manufactured.

The additive manufacturing machine 102 includes an energy beam system 132 configured to generate one or more of energy beams 134 and to direct the energy beams 134 onto the build plane 128 to selectively solidify respective portions of the powder bed 136 defining the build plane 128. The energy beams 134 may be laser beams or beams from any other suitable energy source, such as LEDs or other light sources, and so forth. As the energy beams 134 selectively melt or fuse the sequential layers of build material 118 that define the powder bed 136, the three-dimensional object 114 begins to take shape. The one or more energy beams 134 or laser beams may include electromagnetic radiation having any suitable wavelength or wavelength range, such as a wavelength or wavelength range corresponding to infrared light, visible light, and/or ultraviolet light.

Typically, with a DMLM, EBM, or SLM system, the build material 118 is fully melted, with respective layers being melted or re-melted with respective passes of the energy beams 134. With DMLS or SLS systems, typically the layers of build material 118 are sintered, fusing particles of build material 118 to one another generally without reaching the melting point of the build material 118. The energy beam system 132 may include componentry integrated as part of the additive manufacturing machine 102 and/or componentry that is provided separately from the additive manufacturing machine 102.

The energy beam system 132 may include one or more irradiation devices 138 configured to generate a plurality of energy beams 134 and to direct the energy beams upon the build plane 128. An energy beam system 132 may include a plurality of irradiation devices 138, such as a first irradiation device 138a and a second irradiation device 138b. The one or more irradiation devices 138 may respectively include an energy beam source 140 (e.g., first energy beam source 140a and second energy beam source 140b), an optical assembly 142 (e.g., first optical assembly 142a and second optical assembly 142b, and a scanner 144 (e.g., first scanner 144a and second scanner 144b). The optical assembly 142 may include a plurality of optical elements configured to direct the energy beam onto the build plane 128. The optical assembly 142 may include one or more optical elements, such as lenses through which an energy beam may be transmitted along an optical path from the energy beam source to the build plane. By way of example, an optical assembly 142 may include one more focusing lenses that focus an energy beam 134 on a build plane 128. A scanner 144 may include a galvo scanner, an electro-optic modulator, an acousto-optic modulator, a piezo-driven mirror, or the like. Additionally, or in the alternative, the energy beam system 132 may include a window 146, such as a protective glass, that separates one or more components of the energy beam system 132 from the environment of the process chamber 148 within which build material 118 is irradiated by the one or more energy beams 134 to additively manufacture a three-dimensional object 114.

The window 146 may prevent contaminants from fumes associated with the additive manufacturing process, such as powder material, dust, soot, residues, vapor, byproducts, and the like, from coming into contact with sensitive components of an energy beam system 132. Accumulation of contaminants upon various optical elements of an optical assembly 142 may adversely affect operation of the energy beam system 132 and/or quality metrics associated with an energy beam system. Additionally, or in the alternative, such contaminants may cause damage to various optical elements of an optical assembly 142.

As shown in FIG. 1, the energy beam system 132 includes a first irradiation device 138a and a second irradiation device 138b. Additionally, or in the alternative, an energy beam system 132 may include three, four, six, eight, ten, or more irradiation devices, and such irradiation devices may respectively include an optical assembly 142. The plurality of irradiation devices 138 may be configured to respectively generate one or more energy beams that are respectively scannable within a scan field incident upon at least a portion of the build plane 128 to selectively consolidate the portions of the build material 118 that are to become part of the three-dimensional object 114. For example, the first irradiation device 138a may generate a first energy beam 134a that is scannable within a first scan field 150a incident upon at least a first build plane region 152a. The second irradiation device 138b may generate a second energy beam 134b that is scannable within a second scan field 150b incident upon at least a second build plane region 152b. The first scan field 150a and the second scan field 150b may overlap such that the first build plane region 152a scannable by the first energy beam 134a overlaps with the second build plane region 152b scannable by the second energy beam 134b. The overlapping portion of the first build plane region 152a and the second build plane region 152b may sometimes be referred to as an interlace region 154. Portions of the powder bed 136 to be irradiated within the interlace region 154 may be irradiated by the first energy beam 134a and/or the second energy beam 134b in accordance with the present disclosure.

To irradiate a layer of the powder bed 136, the one or more irradiation devices 138 (e.g., the first irradiation device 138a and the second irradiation device 138b) respectively direct the plurality of energy beams 134 beams (e.g., the first energy beam 134a and the second energy beam 134b) across the respective portions of the build plane 128 (e.g., the first build plane region 152a and the second build plane region 152b) to selectively consolidate the portions of the build material 118 that are to become part of the three-dimensional object 114. The one or more energy beams 134 may become incident upon the build plane 128 defined by the powder bed 136, for example, after passing through one or more optical elements of the optical assembly 142 and/or through a window 146 of the energy beam system 132. As sequential layers of the powder bed 136 are consolidated, a build piston 156 gradually lowers the build platform 130 to make room for sequential layers of build material 118. As sequential layers of build material 118 are applied across the build plane 128, the next sequential layer of build material 118 defines the surface of the powder bed 136 coinciding with the build plane 128. Sequential layers of the powder bed 136 may be selectively consolidated until a completed object 114 has been additively manufactured. In some embodiments, an additive manufacturing machine may utilize an overflow module (not shown) to capture excess build material 118. Additionally, or in the alternative, excess build material 118 may be redistributed across the build plane 128 when applying a next sequential layer of build material 118. It will be appreciated that other systems may be provided for handling the build material 118, including different powder supply systems and/or excess powder recapture systems. The subject matter of the present disclosure may be practiced with any suitable additive manufacturing machine without departing from the scope hereof.

Still referring to FIG. 1, an additive manufacturing machine 102 may include an imaging system 158 (e.g., first imaging system 158a and second imaging system 158b) configured to monitor one or more operating parameters of an additive manufacturing machine 102, one or more parameters of an energy beam system 132, and/or one or more operating parameters of an additive manufacturing process. The imaging system may a calibration system configured to calibrate one or more operating parameters of an additive manufacturing machine 102 and/or of an additive manufacturing process. The imaging system 158 may be a melt pool monitoring system. The one or more operating parameters of the additive manufacturing process may include operating parameters associated with additively manufacturing a three-dimensional object 114. The imaging system 158 may be configured to detect an imaging beam such as an infrared beam from a laser diode and/or a reflected portion of an energy beam (e.g., a first energy beam 134a and/or a second energy beam 134b).

An energy beam system 132 and/or an imaging system 158 may include one or more detection devices. The one or more detection devices may be configured to determine one or more parameters of an energy beam system 132, such as one or more parameters associated with irradiating the sequential layers of the powder bed 136 based at least in part on an assessment beam detected by the imaging system 158. One or more parameters associated with consolidating the sequential layers of the powder bed 136 may include irradiation parameters and/or object parameters, such as melt pool monitoring parameters. The one or more parameters determined by the imaging system 158 may be utilized, for example, by the control system 104, to control one or more operations of the additive manufacturing machine 102 and/or of the additive manufacturing system 100. The one or more detection devices may be configured to obtain assessment data of the build plane 128 from a respective assessment beam. An exemplary detection device may include a camera, an image sensor, a photo diode assembly, or the like. For example, a detection device may include charge-coupled device (e.g., a CCD sensor), an active-pixel sensor (e.g., a CMOS sensor), a quanta image device (e.g., a QIS sensor), or the like. A detection device may additionally include a lens assembly configured to focus an assessment beam along a beam path to the detection device. An imaging system 158 may include one or more imaging optical elements (not shown), such as mirrors, beam splitters, lenses, and the like, configured to direct an assessment beam to a corresponding detection device.

In addition, or in the alternative, to determine parameters associated with irradiation the sequential layers of the powder bed 136, the imaging system 158 may be configured to perform one or more calibration operations associated with an additive manufacturing machine 102, such as a calibration operation associated with the energy beam system 132, one or more irradiation devices 138 or components thereof, and/or the imaging system 158 or components thereof. The imaging system 158 may be configured to project an assessment beam and to detect a portion of the assessment beam reflected from the build plane 128. The assessment beam may be projected by an irradiation device 138 and/or a separate beam source associated with the imaging system 158. Additionally, and/or in the alternative, the imaging system 158 may be configured to detect an assessment beam that includes radiation emitted from the build plane 128, such as radiation from an energy beam 134 reflected from the powder bed 136 and/or radiation emitted from a melt pool in the powder bed 136 generated by an energy beam 134 and/or radiation emitted from a portion of the powder bed 136 adjacent to the melt pool. The imaging system 158 may include componentry integrated as part of the additive manufacturing machine 102 and/or componentry that is provided separately from the additive manufacturing machine 102. For example, the imaging system 158 may include componentry integrated as part of the energy beam system 132. Additionally, or in the alternative, the imaging system 158 may include separate componentry, such as in the form of an assembly, that can be installed as part of the energy beam system 132 and/or as part of the additive manufacturing machine 102.

Still referring to FIG. 1, in some embodiments, an inertization system 160 may supply a flow of inert process gas 162 to one or more regions the process chamber 148, such as a region between the energy beam system 132 and the powder bed 136. The flow of inert process gas 162 may remove fumes from the process chamber 148 and/or to reduce the tendency of fumes to interfere with the energy beams 134 used to irradiate the build material 118. Such fumes may present in the form of a plume emanating from a consolidation zone where an energy beam 134 becomes incident upon the powder bed 136 and may sometimes be referred to as a fume plume. A fume plume may include build material, dust, soot, residues, vapors, byproducts, and the like. The flow if inert process gas 162 may also reduce the tendency of contaminants from fumes to deposit on the on the window 146, optical elements of the optical assembly 142, or other components of the energy beam system 132. The inertization system 160 may provide a directional flow of inert process gas 162 that flows across the build plane 128. For example, as shown, the inert process gas 162 flows from left to right. The inertization system 160 may include a supply manifold 164 and a return manifold 166. The inert process gas 162 may flow from the supply manifold 164 to the return manifold 166. Fumes in the process chamber 148 may be drawn into the return manifold 166. In some embodiments, the supply manifold 164 and/or the return manifold 166 may be coupled to, or define a portion of, a perimeter wall of the process chamber 148. Additionally, or in the alternative, the supply manifold 164 and/or the return manifold 166 may be coupled to a housing assembly 168 that contains one or more components of the energy beam system 132, such as one or more irradiation devices 138 and or one or more imaging systems 158. With the supply manifold 164 and/or the return manifold 166 coupled to the housing assembly 168, a relatively small volume of space between the energy beam system 132 and the powder bed 136 may be inertized, as opposed to inertizing an entire interior of the process chamber 148. Additionally, or in the alternative, a fume plume may have a shorter path to travel before being drawn into the return manifold 166 by the flow of inert process gas 162.

The energy beam system 132 may be positioned at any suitable location within the process chamber 148. Additionally, or in the alternative, the energy beam system 132 may be coupled to a perimeter wall of the process chamber 148. In some embodiments, an additive manufacturing machine may include a positioning system 170 configured to move an energy beam system 132 and/or one or more components thereof relative to the build plane 128. The positioning system 170 may be configured to move the energy beam system 132 and/or one or more components thereof to specified build coordinates and/or along specified build vectors corresponding to a cartesian coordinate system in accordance with control commands provided, for example, by the control system 104. The control commands may be provided, for example, to carry out operations of the one or more energy beam system 132 and/or of the additive manufacturing machine 102 in accordance with the present disclosure. The positioning system 170 may include one or more gantry elements 172 configured to move the energy beam system 132 and/or one or more components thereof across the powder bed. The gantry elements 172 may respectively be configured to move the energy beam system 132 and/or one or more components thereof in one or more directions, such as an X-direction, a Y-direction, and/or a Z-direction. In some embodiments, the positioning system 170 may be coupled to the housing assembly 168 that contains one or more components of the energy beam system 132. The housing assembly 168 may be coupled to one or more gantry elements 172 by one or more gantry mounts 174. The positioning system 170 may include a drive motor 176 configured to move the housing assembly 168 and/or the one or more components the energy beam system 132 according to instructions for the control system 104. The positioning system 170 may include componentry typically associated with a gantry system, such as stepper motors, drive elements, carriages, and so forth.

Referring now additionally to FIGS. 2-5, a build plane 128 is illustrated for forming a layer of the three-dimensional object 114. Depending on the particular layer being additively manufactured, the individual layer of the three-dimensional object 114 may generally comprise an outer edge 153 that at least partially surrounds and interior area 149, both of which can be respectively consolidated using one or more energy beams 134.

The first energy beam 134a and second energy beam 134b (illustrated in FIG. 1) can be directed to scan across the build plane 128 to consolidate build material 118 in at least a first build plane region 152a and second build plane region 152b respectively to form at least a portion of the layer of the three-dimensional object 114.

The first build plane region 152a can generally comprise a plurality of first hatching paths 151a and a first edge portion 153a. Likewise, the second build plane region 152b can comprise a plurality of second hatching paths 151b and a second edge portion 153b. Moreover, the first build plane region 152a and the second build plane region 152b can be adjacent to one another and, as should be appreciated herein, include an interlace region 154 wherein the first build plane region 152a and the second build plane region 152b at least partially overlap.

The plurality of first hatching paths 151a and the plurality of second hatching paths 151b may generally comprise at least a portion of the interior area 149 of the three-dimensional object 114 within a respective build layer. For example, the plurality of first hatching paths 151a and the plurality of second hatching paths 151b may form a solid interior portion of the three-dimensional object 114. Any suitable scan configuration may be utilized to consolidate the build material 118 within the plurality of first hatching paths 151a and the plurality of second hatching paths 151b. For example, the plurality of first hatching paths 151a and the plurality of second hatching paths 151b may be consolidated by scanning the first energy beam 134a and the second energy beam 134b in a plurality of parallel paths to consolidate respective areas in the build plane 128 to form a solid portion of the three-dimensional object 114. The specific pattern for consolidating the solid portion may, for example, be manually programmed, computationally derived, or determined via a combination of the two. For instance, a computational algorithm may be employed to determine an efficient scan pattern within the plurality of first hatching paths 151a and the plurality of second hatching paths 151b based on scan speed, dot size, plume projection, and/or any other relevant parameters of the additive manufacturing system 100.

Figure 2:
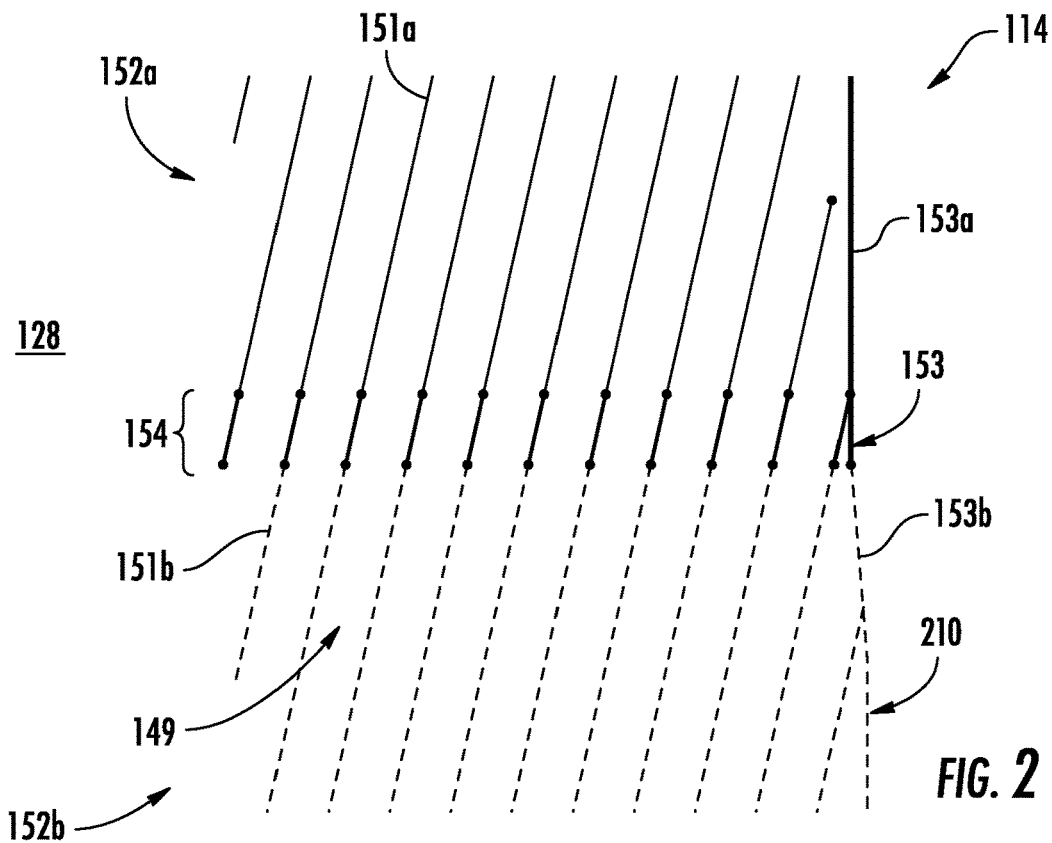
FIG. 2 schematically depicts a build plane in accordance with one or more exemplary aspects of the present disclosure.
Figure 3:
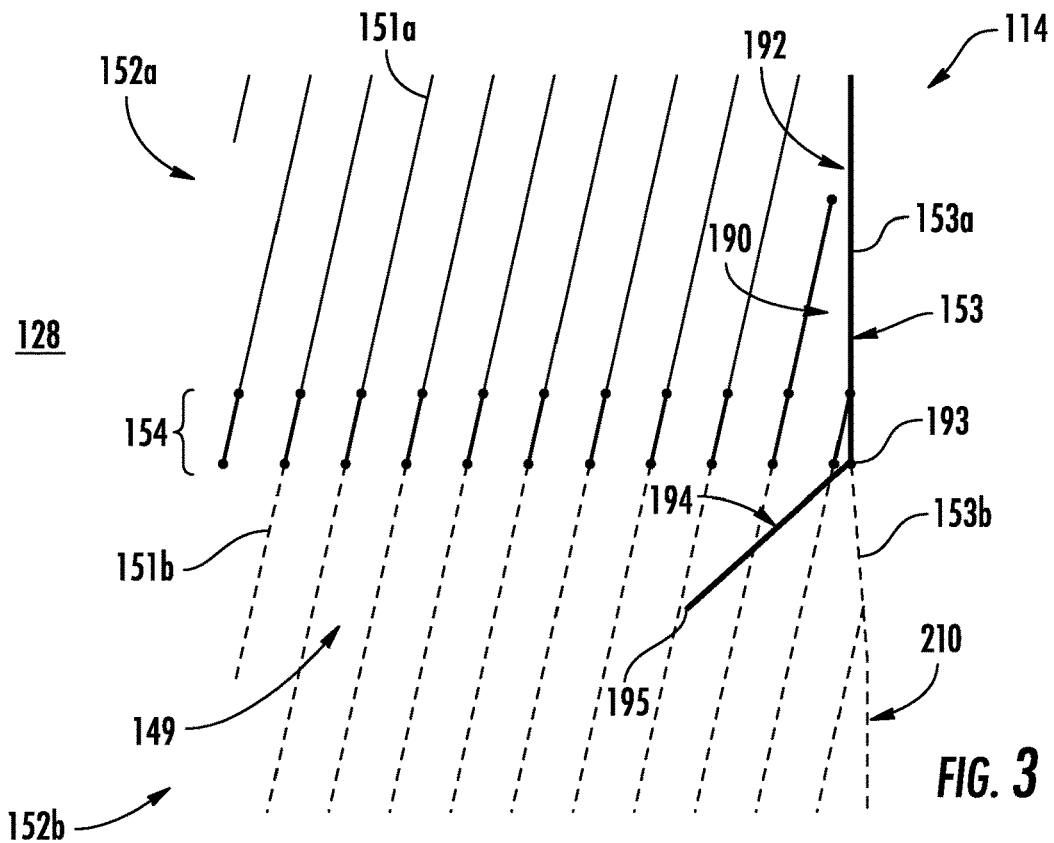
FIG. 3 schematically depicts a build plane with a first stitching portion in accordance with one or more exemplary aspects of the present disclosure.

In some embodiments, the hatching pattern of the plurality of first hatching paths 151a and the hatching pattern of the plurality of second hatching paths 151b may comprise a substantially similar pattern and potentially be aligned with one another. For example, as illustrated in FIGS. 2 and 3, the hatching pattern for both the plurality of first hatching paths 151a and the plurality of second hatching paths 151b may each comprise a plurality of scan paths comprising the same spacing, angle, and vectors such that the plurality of first hatching paths 151a and the plurality of second hatching paths 151b combine to form a substantially continuous pattern (i.e., wherein the scan paths align and transition into one another) between the first build plane region 152a and the second build plane region 152b.

As stated above, the first build plane region 152a and the second build plane region 152b further comprises a first edge portion 153a and a second edge portion 153b which combine to form at least a portion of the outer edge 153 of the three-dimensional object 114. The outer edge 153 may comprise an outer surface of the three-dimensional object 114 itself, such as the outer surface of a sphere, cube, or other shape defined by the three-dimensional object 114. In other embodiments, the outer edge 153 may comprise an exterior surface of an internal feature of the three-dimensional object 114. For example, the three-dimensional object 114 may comprise one or more passageways (e.g., cooling channels) passing through its interior. In such embodiments, the outer edge 153 may comprise an exterior surface of a passageway.

The outer edge 153 can be split into one or more portions depending on, for example, the amount of different energy beams used to consolidate different regions in the build plane 128. For example, where a first energy beam 134a and a second energy beam 134b are used, the outer edge 153 of the three-dimensional object 114 may comprise a first edge portion 153a in a first build plane region 152a and a second edge portion 153b in a second build plane region 152b. Similar to the plurality of first hatching paths 151a and the plurality of second hatching paths 151b, the first edge portion 153a and the second edge portion 153b may substantially align with one another to form the outer edge 153 of the three-dimensional object 114 via one boundary. As should be appreciated herein, the outer edge 153 may comprise a variety of configurations such as a linear configuration (i.e., a single linear line) or a non-linear configuration (e.g., curves, arcs, bends, turns, or the like).

Overall, the first build plane region 152a and the second build plane regions 152b may at least partially overlap with one another in an interlace region 154. The interlace region 154 may help promote build quality of the three-dimensional object 114 between the first build plane region 152a and the second build plane regions 152b despite the use of multiple energy beams 134 such as the first energy beam 134a and second energy beam 134b.

The interlace region 154 can comprise an overlap of both the plurality of first hatching paths 151a with the plurality of second hatching paths 151b, in addition to an overlap of the first edge portion 153a with the second edge portion 153b. The amount of overlap may be relatively consistent along the border between the first build plane region 152a and the second build plane regions 152b or may vary along the border between the first build plane region 152a and the second build plane regions 152b. Moreover, the amount of overlap between the plurality of first hatching paths 151a with the plurality of second hatching paths 151b may be similar to or dissimilar to the amount of overlap between the first edge portion 153a with the second edge portion 153b.

To assist in the consolidation of build material 118 in the first build plane region 152a and promote efficient transition and alignment with the second build plane region 152b, the first build plane region 152a may be consolidated using a first contour path 190. Generally, the first contour path 190 may both consolidate the first edge portion 153a of the first build plane region 152a (such as to define a portion of the outer edge 153 of the three-dimensional object 114) and provide additional stitching into the second build plane region 152b. The additional stitching into the second build plane region 152b by the first contour path 190 can help account for and/or mitigate effects of potential misalignment in the first energy beam 134a and/or the second energy beam 134b.

Figure 4:
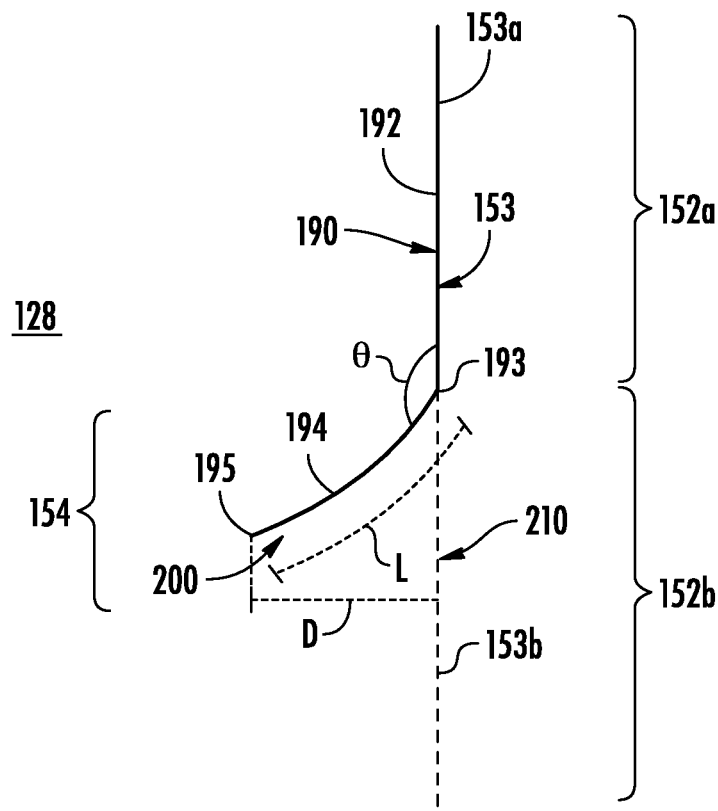
FIG. 4 schematically depicts a first contour path in accordance with one or more exemplary aspects of the present disclosure.
Figure 5:
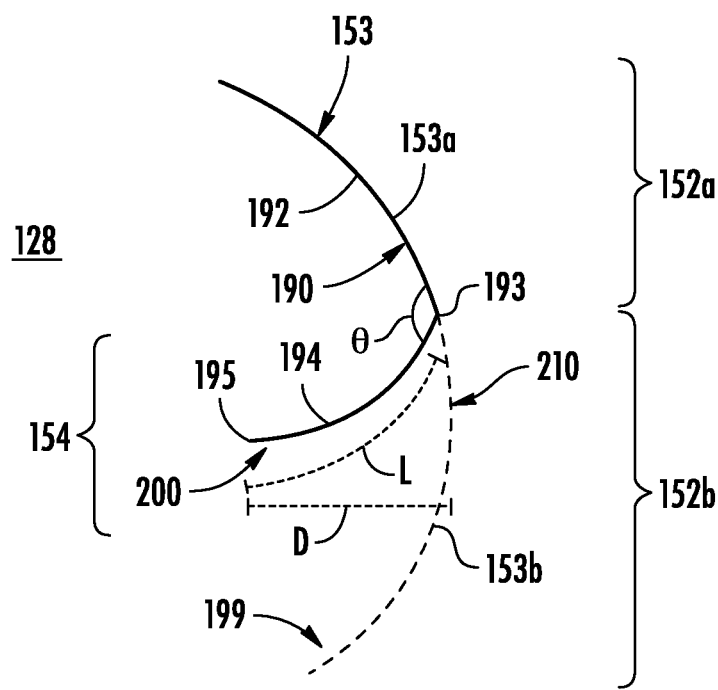
FIG. 5 schematically depicts another first contour path in accordance with one or more exemplary aspects of the present disclosure.

With particular reference to FIGS. 4-5, the first contour path 190 can comprise a first outer contour portion 192 and a first stitching portion 194. The first outer contour portion 192 can at least partially define a first edge portion 153a of the outer edge 153 of the three-dimensional object 114. Likewise, the first stitching portion 194 can generally extend from the end of the first outer contour portion 192, such as at a transition point 193, into the second build plane region 152b. The shape, length, configuration, and other parameters of the first outer contour portion 192 and the first stitching portion 194 can embody multiple variations such as, for example, a configuration based in part on the outer edge 153 of the three-dimensional object 114.

The first outer contour portion 192 can extend for any length and configuration as needed to define the first edge portion 153a of the outer edge 153 of the three-dimensional object 114 for the respective build plane 128. Thus, the path of the first outer contour portion 192 will depend on the shape of the three-dimensional object 114 in the respective build plane 128.

In some embodiments, the first outer contour portion 192 can comprise a linear configuration, such as for a flat wall of a three-dimensional object 114. In some embodiments, the first edge portion 153a of the three-dimensional object 114 can be non-linear (e.g., curves, arcs, bends, turns, or the like). Moreover, as illustrated in FIGS. 2 and 3, the first outer contour portion 192 may comprise a scan path direction that is similar to or dissimilar to the scan path direction of the plurality of first hatching paths 151a of the first build plane region 152a. For example, as illustrated in FIGS. 2 and 3, the scan path of the first outer contour portion 192 may follow a scan path direction that is unique from the scan path direction of the plurality of first hatching paths 151a.

The first outer contour portion 192 may be consolidated using any suitable power, spot size, focus depth, travel speed, and other beam parameters for sufficient consolidation of build material 118 along the first outer contour portion 192. Moreover, the power, spot size, focus depth, travel speed, and other beam parameters for the first outer contour portion 192 and the power, spot size, focus depth, travel speed, and other beam parameters used for the plurality of first hatching paths 151a may be the same, different, or combinations thereof.

As stated above, the first contour path 190 further comprises the first stitching portion 194 that extends into the second build plane region 152b. The first outer contour portion 192 of the first contour path 190 can transition into the first stitching portion 194 at the transition point 193. The transition point 193 refers to the point where the scan path of the first contour path 190 breaks off of the outer edge 153 (and specifically the first edge portion 153a) and extends inwards into the second build plane region 152b.

The first stitching portion 194 can comprise any non-linear stitching path 200 that extends into the second build plane region 152b. The non-linear stitching path 200 can comprise one or more turns, bends, arcs, curves, or the like, with or without one or more individual linear segments included therein. Alternatively, or additionally, the first stitching portion 194 may comprise a plurality of linear parts arranged at different angles. In some embodiments, the non-linear stitching path 200 may comprise a plurality of linear piecemeal segments. The non-linear stitching path 200 can thus be utilized to tailor the position of the first stitching portion 194 with respect to the outer edge 153 and/or the interlace region 154. Moreover, in some embodiments, the first stitching portion 194 may extend back into the first build plane region 152a after extending into the second build plane region 152b.

As best illustrated in FIG. 4, the first stitching portion 194 may transition away from first edge portion 153a at the transition point 193 to form an angle θ. As used herein, angle θ refers to the interior angle between the first outer contour portion 192 and the first stitching portion 194 which faces the interior area 149. Where the first edge portion 153a and/or the first stitching portion 194 comprise a non-linear segment, a tangent at any given point can be used for determination of the angle θ. In some embodiments, the angle θ between the first stitching portion 194 and the first outer contour portion 192 may be between 90 degrees and 180 degrees. In some embodiments, the angle θ between the first stitching portion 194 and the first outer contour portion 192 may be between 110 degrees and 160 degrees. In some embodiments, the angle θ between the first stitching portion 194 and the first outer contour portion 192 may be between 130 degrees and 140 degrees. In some embodiments, the angle θ between the first stitching portion 194 and the first outer contour portion 192 may be 135 degrees.

Moreover, due to the non-linear stitching path 200 of the first stitching portion 194, the angle θ may vary as the first stitching portion 194 extends further from the transition point 193. If an initial part of the first stitching portion 194 is linear, then the angle θ will remain constant for that initial part. However, once the first stitching portion 194 reaches its non-linear portion(s), the angle θ, which can be measured based on a tangent at any particular point along the first stitching portion 194, will necessarily vary. For example, if the first stitching portion 194 comprises a curved path, the angle θ may start at an initial degree (e.g., 160 degrees) and then decrease as the first stitching portion 194 moves further away from the outer edge 153 in a curved path. In some embodiments, the angle θ may increase at one or more points such as if the first stitching path were to deviate back towards the outer edge 153 or, for example, comprise a sinusoidal or otherwise undulating path.

With reference to FIGS. 3 and 4, the first stitching portion 194 may extend from the transition point 193 to an end point 195 along any non-linear stitching path 200 for any suitable length L. The length L of the first stitching portion 194 may depend on the dimensions of the interlace region 154, the distance travelled into the second build plane region 152b, the desired distance of the end point 195 from the outer edge 153 of the three-dimensional object 114, the parameters of the first energy beam 134a (e.g., power, spot size, focus depth, travel speed), and/or any other relevant constraints. In some embodiments, the length L could be between 300 μm and 500 μm, between 350 μm and 450 μm, or be 400 μm.

The end point 195 of the first stitching portion 194 is separated from the outer edge 153 of the three-dimensional object 114 by a distance D (i.e., the distance between the end point 195 and the closest portion of the outer edge 153). In some embodiments, the angle θ, length L, and/or path trajectory may vary until a distance D is reached that satisfies a predetermined target. The predetermined target can be a minimum distance D from the outer edge 153 and can, for example, be set by an operator, calculated based on component inputs (e.g., energy beam parameters), or a combination thereof. In some embodiments, the distance D could be between 100 μm and 200 μm, between 125 μm and 175 μm, or be 150 μm. It should be appreciated, however, that these ranges are exemplary and not limiting. Moreover, the angle θ may decrease along the first stitching portion 194 such that the first stitching portion 194 curls inwards into the three-dimensional object 114 (i.e., away from the outer edge 153) until a target distance D is achieved. Alternatively, or additionally, the first stitching portion 194 may comprise an arc pattern that curves between the transition point 193 and the end point 195, wherein the end point 195 is determined when its distance D reaches a target. In some embodiments, the first stitching portion may require a minimum length L such that the path of the first stitching portion 194 is modified (e.g., curved or ungulated) to increase the length L before reaching the end point 195 having a target distance D from the outer edge 153.

With reference to FIGS. 2-5, the build plane 128 further comprises the second build plane region 152b that is consolidated by the second energy beam 134b. The second build plane region 152b comprises the plurality of second hatching paths 151b and the second edge portion 153b. The second edge portion 153b is adjacent to and combines with the first edge portion 153a to define at least a portion of the outer edge 153 of the three-dimensional object 114 in the given build plane 128.

The second edge portion 153b is consolidated using the second energy beam 134b travelling along a second contour path 210. Similar to the first outer contour portion 192 of the first contour path, the shape, length, configuration, and other parameters of the second contour path 210 will depend on the outer edge 153 of the three-dimensional object. For instance, the second contour path 210 can start at that transition point 193 of the first contour path 190 and continue along the outer edge 153 of the three-dimensional object 114 for the second build plane region 152b. Depending on the relevant portion of the outer edge 153 of the three-dimensional object 114, the second contour path 210 can extend on a linear path or a non-linear path. For example, in some embodiments, both the first edge portion 153a and the second edge portion 153b may be non-linear such that the first outer contour portion 192 (of the first contour path 190) and the second contour path 210 may be non-linear.

With particular reference to FIG. 5, in some embodiments, the first stitching portion 194 of the first contour path 190 may travel a non-linear stitching path 200 that comprises a partial representation of the outer edge 153 of the three-dimensional object 114, such as the second edge portion 153b. As used herein, partial representation refers to a copy of at least a portion of the outer edge 153. That is, the non-linear stitching path 200 may comprise, for example, the same path configuration as the second contour path 210, albeit rotated inwards about the transition point 193. Thus, if the outer edge 153 comprises a curved arc such that the second contour path 210 would travel said curved arc, the non-linear stitching path 200 of the first stitching portion 194 would also travel in the same curved arced pattern, albeit on a path that is rotated inwards into the three-dimensional object 114. Such embodiments may help account for and/or mitigate effects of potential misalignment in the first energy beam 134a and/or second energy beam 134b by smoothing and reducing defects in the consolidated material. That is, potential roughness or defects that may occur due to misalignment between two adjacent hatching paths can be mitigated by the first stitching portion extending into the adjacent region or hatching paths.

For example, in some embodiments, the first stitching portion 194 may comprise any length or section of the second edge portion 153b rotated inwards about the transition point 193 at any suitable angle θ. In some embodiments, the angle θ may be predetermined and the first stitching portion 194 may be chosen to comprise a partial representation of the outer edge 153, or may comprise an alternative non-linear stitching path. Then, the first stitching portion 194 may extend for any suitable length L until the distance D between the end point 195 and outer edge 153 reaches a predetermined minimum. In other embodiments, the length L of the first stitching portion 194 may be predetermined and the angle θ may subsequently be chosen so that it results in an end point 195 at a minimum distance D from the outer edge 153.

Depending on the shape of the three-dimensional object 114 in a given build layer, the outer edge 153, and specifically the first edge portion 153*a* and the second edge portion 153*b*, may comprise a variety of configurations. For example, with reference to FIGS. 6A-7C, various exemplary embodiments are illustrated for three-dimensional objects 114 comprising different configurations for the outer edge 153 (FIGS. 6A-6C) and non-linear stitching paths 200 for the first stitching portions 194 to be used therewith (FIGS. 7A-7C). However, while FIGS. 4, 5, 6A-6C, and 7A-7C all illustrate different configurations, such configurations are illustrated separately for convenience and it should be appreciated that they are not mutually exclusive. That is, the respective edges, stitching paths, and other configurations from the respective figures can be combined into other embodiments not explicitly shown.

Figure 6A:
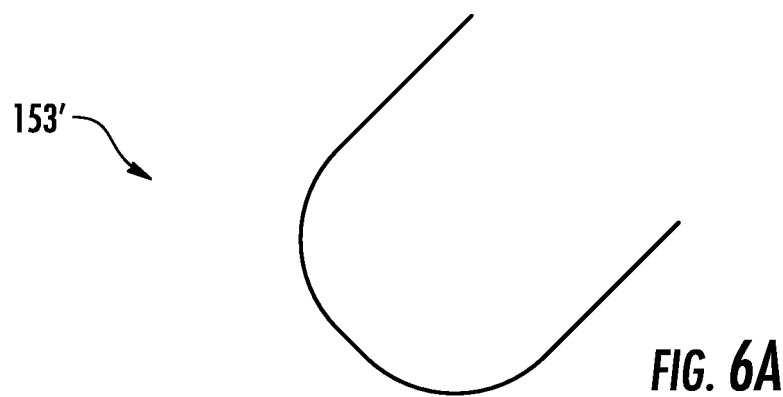
FIGS. 6A-6C schematically depict various outer edges of three-dimensional objects in accordance with one or more exemplary aspects of the present disclosure.
Figure 7A:
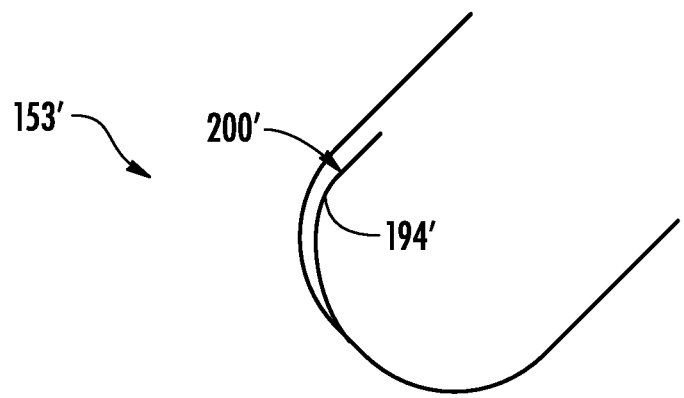
FIGS. 7A-7C schematically depict various first contour paths and outer edges of the three-dimensional objects of FIGS. 6A-6C in accordance with one or more exemplary aspects of the present disclosure.
Figure 7B:
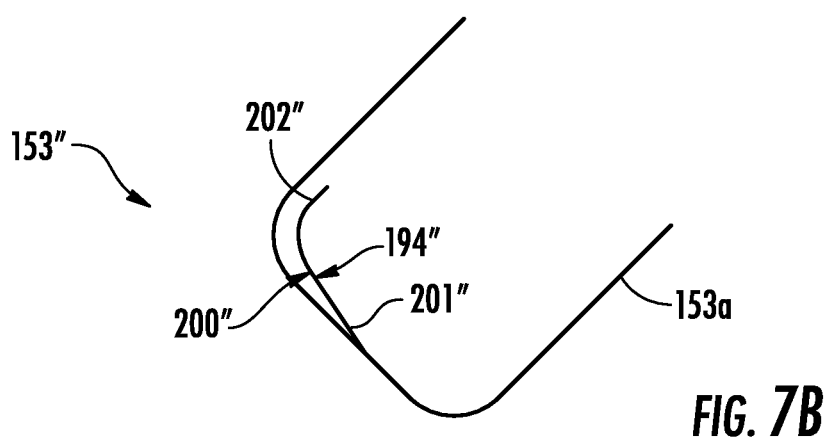
Figure 7C:
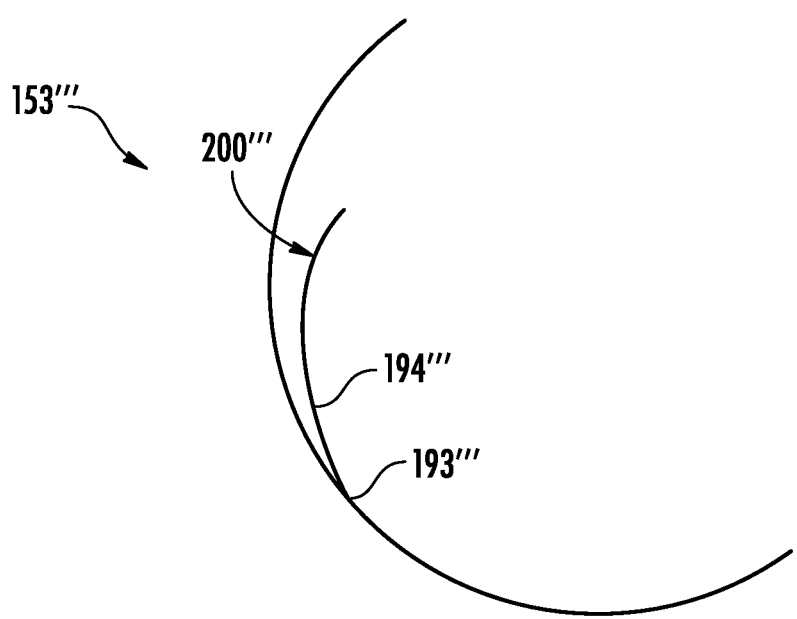

In some embodiments, such as that illustrated in FIG. 6A, the three-dimensional object may comprise an outer edge 153' that has a curved end connecting one or more linear portions. In such embodiments, such as that illustrated in FIG. 7A, the non-linear stitching path 200' of the first stitching portion 194' may, for example, comprise a curve that moves inward into the three-dimensional object.

Figure 6B:
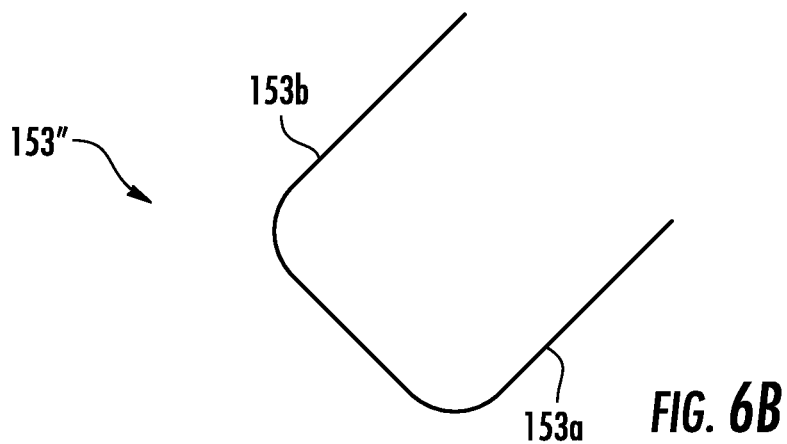

In some embodiments, such as that illustrated in FIG. 6B, the three-dimensional object may comprise an outer edge 153" that has multiple linear walls meeting at defined or curved intersections such as a squoval. In such embodiments, such as that illustrated in FIG. 7*b*, the non-linear stitching path 200" of the first stitching portion 194" may, for example, comprise a linear part 201" followed by curved part 202", such as one that curves inward into the three-dimensional object.

Figure 6C:
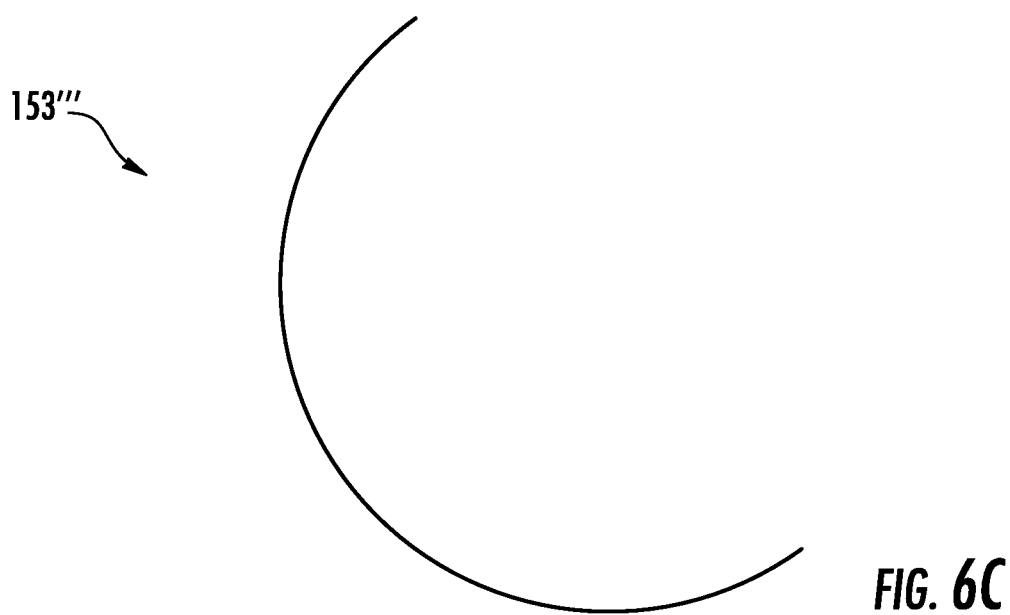

In some embodiments, such as that illustrated in FIG. 6*c*, the three-dimensional object may comprise an outer edge 153''' that has a curve. In such embodiments, such as that illustrated in FIG. 7*c*, the non-linear stitching path 200''' of the first stitching portion 194''' may, for example, comprise a similar curve that moves inward into the three-dimensional object, but which is rotated inward about the transition point 193'''.

While specific configurations of three-dimensional objects 114 and their outer edges 153 are disclosed herein, along with non-linear stitching paths 200 for the first stitching portions 194 of the first contour paths 190, it should be appreciated that these disclosed embodiments are not intended to be exhaustive or limiting and that further non-linear stitching paths 200 may further be realized within the scope of this disclosure.

In addition to specific configurations for the outer edge 153, the first contour path 190, and the second contour path 210, one or more parameters of the first energy beam 134*a* and/or the second energy beam 134*b* may vary depending on the specific build. In some embodiments, a power, spot size, focus depth, travel speed, and/or other beam parameter for the first energy beam 134*a* may differ from the respective power, spot size, focus depth, travel speed, and/or other beam parameter for the second energy beam 134*b*. Moreover, the power, spot size, focus depth, travel speed, and/or other beam parameter may vary within a first contour path 190 or second contour path 210 by the first energy beam 134*a* or second energy beam 134*b*, respectively. For example, the power of the first energy beam 134*a* for the first contour path 190 may taper, decrease, or otherwise change between the first outer contour portion 192 and the first stitching portion 194 (e.g., the first stitching portion 194 may use a lower power of the first energy beam 134*a* than the first outer contour portion 192).

The first energy beam 134*a* and the second energy beam 134*b* may consolidate the first build plane region 152*a* and the second build plane region 152*b* in a variety of respective orders. In some embodiments, the first energy beam 134*a* and the second energy beam 134*b* consolidate the first build plane region 152*a* and the second build plane region 152*b* in parallel such that at least part of the first contour path 190 and at least part of the second contour path 210 are consolidated at the same time.

Figure 8:
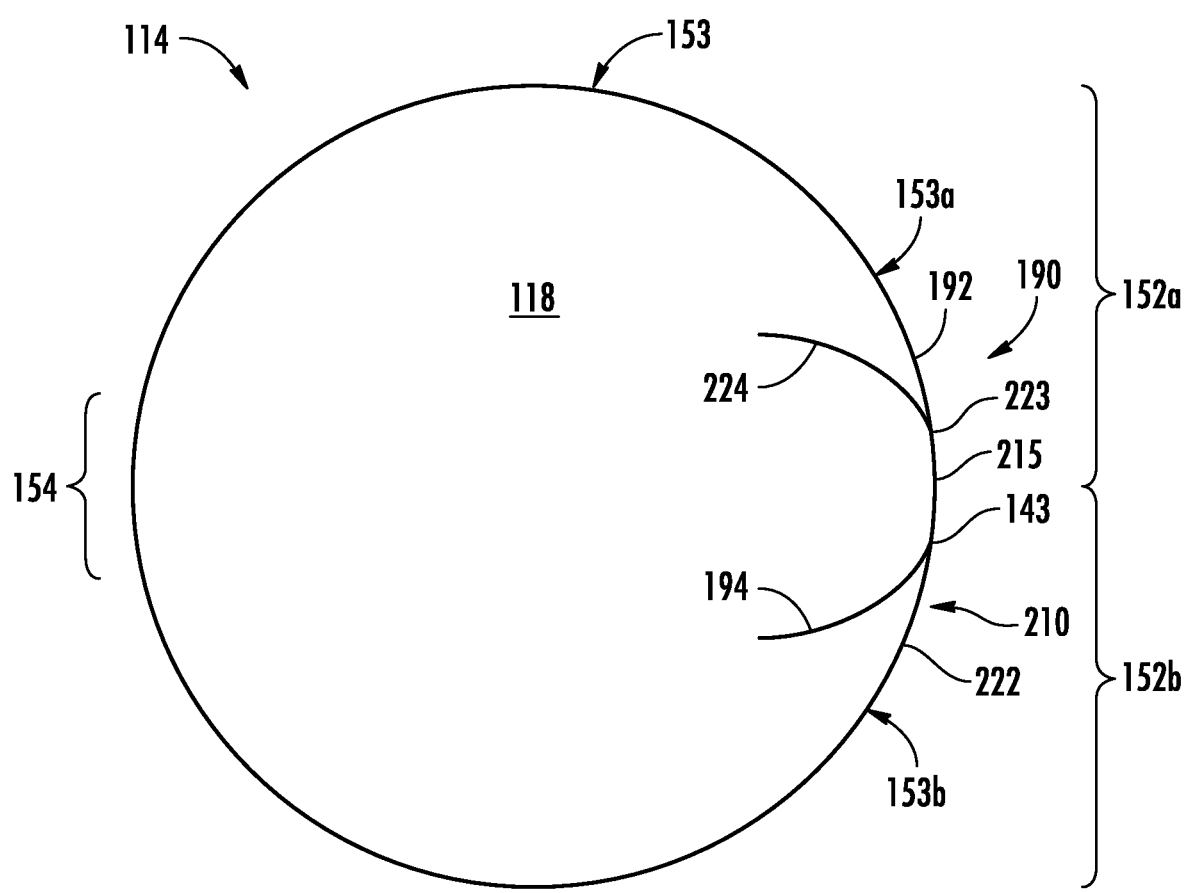
FIG. 8 schematically depicts multiple contour paths in accordance with one or more exemplary aspects of the present disclosure.

Referring now to FIG. 8, in some embodiments both the first contour path 190 and the second contour path 210 may facilitate contoured stitching. For example, as discussed above, the first contour path may comprise the first outer contour portion 192 (corresponding to the first edge portion 153*a* of the outer edge 153 of the three-dimensional object 114) and the first stitching portion 194. Likewise, the second contour path 210 may also comprise a second outer contour portion 222 (corresponding to the second edge portion 153*b* of the outer edge 153 of the three-dimensional object 114) and a second stitching portion 224. In some particular embodiments, the second stitching portion 224 may also comprise a non-linear stitching path 200. In such embodiments, the non-linear stitching paths 200 for the first stitching portion 194 and the second stitching portion 224 may comprise similar configurations such as a mirrored layout of one another as illustrated in FIG. 8. Alternatively, each of the non-linear stitching paths 200 for the first stitching portion 194 and the second stitching portion 224 may comprise their own unique characteristics including length L, distance D, angle θ (see exemplary illustrations in FIG. 4), or a combination thereof.

Moreover, one or more laser parameters may vary between the first contour path 190 and the second contour path 210, and in particular, between the first stitching portion 194 and the second stitching portion 224. For example, the laser power used for the first stitching portion 194 and the second stitching portion 224 may decrease as they reach an overlap 215 such that the build material 118 does not receive excessive energy input where both the first energy beam 134*a* and the second energy beam 134*b* (see FIG. 1) are consolidating the build material 118. It should be appreciated that further variations and permutations between the first contour path 190 and the second contour path 220, including parameters of the first energy beam 134*a* and the second energy beam 134*b* and/or configurations of the one or more non-linear stitching paths 200, may further be realized within the scope of this disclosure. By varying one or more laser parameters, a more regular level of energy can be collectively introduced to avoid or reduce weld penetration resulting from excessive heat input. For instance, reduced power can be used in critical or sensitive areas to ensure regular energy input. This can result in improved surface quality compared to other additive manufacturing processes using overlying vectors with constant laser parameters.

Figure 9:
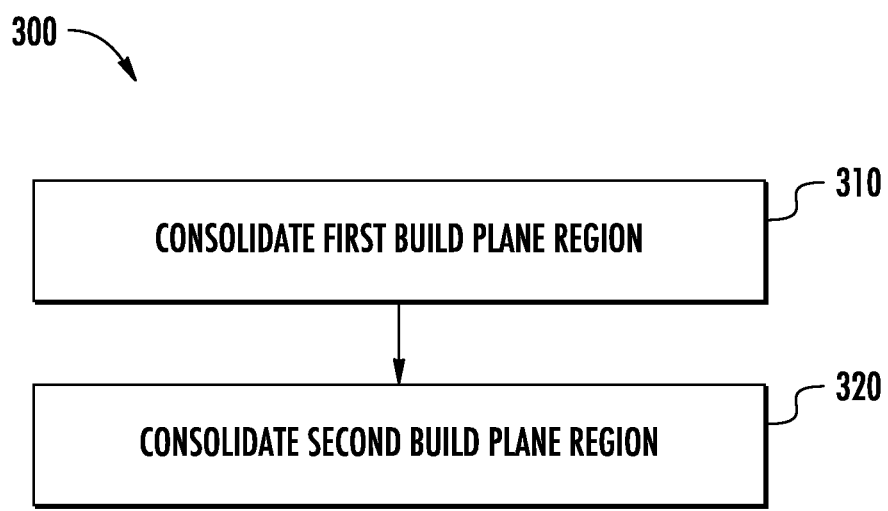
FIG. 9 is a flow chart diagram illustrating an exemplary method of additively manufacturing a three-dimensional object in accordance with one or more exemplary aspects of the present disclosure; and, FIG. 10 schematically depicts an exemplary controls system that may be configured to control an additive manufacturing system or machine in accordance with one or more exemplary aspects of the present disclosure.

Referring now additionally to FIG. 9, a method 300 is illustrated for additively manufacturing a three-dimensional object 114. The method 300 generally comprises selectively directing a first energy beam 134*a* travelling across a powder bed 136 along a plurality of first hatching paths 151*a* and a first contour path 190 in step 310 to consolidate a first build plane region 152*a*. The method 300 further comprises selectively directing a second energy beam 134*b* travelling across the powder bed 136 along a plurality of second hatching paths 151*b* and a second contour path 210 in step 320 to consolidate a second build plane region 152*b*.

The first contour path 190 comprises a first outer contour portion 192 and a first stitching portion 194, wherein the first outer contour portion 192 at least partially defines a first edge portion 153a of an outer edge 153 of the three-dimensional object 114.

Moreover, the second contour path 210 at least partially defines a second edge portion 153b of the outer edge 153 of the three-dimensional object 114, and wherein the second edge portion 153b is adjacent the first edge portion 153a. Further, the first stitching portion 194 extends into the second build plane region 152b along a non-linear stitching path 200.

As discussed above, the outer edge 153 of the three-dimensional object 114, the first contour path 190, and/or the second contour path 210 may comprise various alternative configurations. For example, in some embodiments, the first edge portion 153a consolidated in step 310 is non-linear. Alternatively, or additionally, in some embodiments, the second edge portion consolidated in step 320 is non-linear.

In some embodiments, the non-linear stitching path 200 can comprise a partial representation of the outer edge 153 of the three-dimensional object 114. In some embodiments, the non-linear stitching path 200 can comprise a linear part and a curved part. In some embodiments, the non-linear stitching path 200 comprises a plurality of linear parts 201 arranged at different angles. In some embodiments, the non-linear stitching path 200 moves away from the outer edge 153 until a predetermined distance D is obtained between an end point 195 of the first stitching portion 194 and the closest portion of the outer edge 153. In some embodiments, a parameter for the first energy beam 134a varies between the first outer contour portion 192 and the first stitching portion 194. For example, In some embodiments, a power for the first energy beam 134a is lower for the first stitching portion 194 compared to the first outer contour portion 192. In some embodiments, the first build plane region 152a and the second build plane region 152b at least partially overlap to define an interlace region 154. In some embodiments, the first stitching portion 194 of the first contour path 190 is contained within the interlace region 154. In some embodiments, the first energy beam 134a consolidates the first build plane region 152a and the second energy beam 134b consolidates the second build plane region 152b in parallel.

Figure 10:
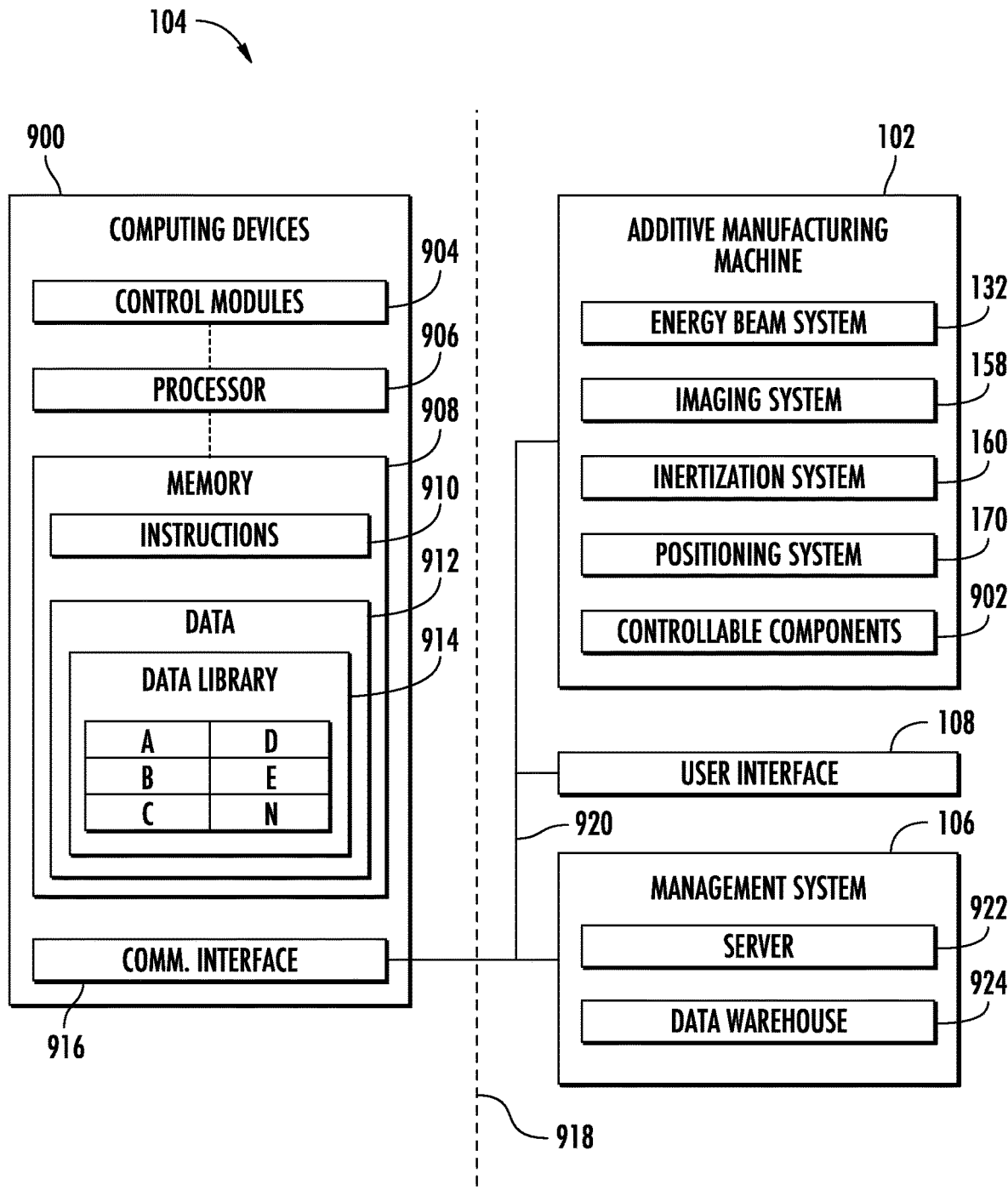

Now turning to FIG. 10, a control system 104 is illustrated. The control system 104 may be configured to perform one or more control operations associated with an additive manufacturing system 100 and/or an additive manufacturing machine 102. The control operations may include one or more parts of method 300 disclosed herein, and/or one or more operations to otherwise consolidate the three-dimensional object 114 in accordance with the disclosure presented herein.

For example, the control operations can include consolidating a first build plane region 152a using a first energy beam 134a travelling along a first contour path 190 and consolidating a second build plane region 152b using a second energy beam 134b travelling along a second contour path 210. The first contour path 190 can comprise a first outer contour portion 192 and a first stitching portion 194, wherein the first outer contour portion 192 at least partially defines a first edge portion 153a of an outer edge 153 of the three-dimensional object 114. Moreover, the second contour path 210 can at least partially define a second edge portion 153b of the outer edge 153 of the three-dimensional object 114, wherein the second edge portion 153b is adjacent the first edge portion 153a. Further, the first stitching portion 194 can extend into the second build plane region 152b along a non-linear stitching path 200.

As shown in FIG. 10, a control system 104 may include one or more computing devices 900. The one or more computing devices 900 may be communicatively coupled with an additive manufacturing machine 102 and/or additive manufacturing system 100. For example, a computing device 900 may be communicatively coupled with one or more controllable components 902 of an additive manufacturing machine 102, such as one or more controllable components 902 associated with an energy beam system 132, an imaging system 158, an inertization system 160, and/or a positioning system 170. Additionally, or in the alternative, a computing device 900 may be communicatively coupled with a management system 106 and/or a user interface 108. The one or more computing devices 900 may be located locally or remotely relative to an additive manufacturing machine 102.

The one or more computing devices 900 may include one or more control modules 904 configured to cause the computing device 900 to perform one or more control operations. The one or more control modules 904 may include one or more irradiation control modules 800. The one or more control modules 904 may include control logic executable to provide control commands configured to control the one or more controllable components 902 associated with an additive manufacturing machine 102.

The one or more computing devices 900 may include one or more processors 906 and one or more memory devices 908. The one or more processors 906 may include any suitable processing device, such as a microprocessor, microcontroller, integrated circuit, logic device, and/or other suitable processing device. The one or more memory devices 908 may include one or more computer-readable media, including but not limited to non-transitory computer-readable media, RAM, ROM, hard drives, flash drives, and/or other memory devices 908. The one or more control modules 904 may be implemented at least in part by the one or more processors 906 and/or the one or more memory devices 908.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 908 may include, but is not limited to, a non-transitory computer-readable medium, such as a random-access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 908 may store information accessible by the one or more processors 906, including computer-executable instructions 910 that can be executed by the one or more processors 906. The computer-executable instructions 910 may include any set of instructions which when executed by the one or more processors 906 cause the one or more processors 906 to perform operations, including calibration operations, and/or additive manufacturing operations. For example, the computer-executable instructions 910 may be configured to cause the one or more processors 906 to perform one or more of the steps presented in method 300 (FIG. 9) or otherwise presented in this disclosure. In some embodiments, the computer-executable instructions 910 may be configured to cause the one or more processors 906 to consolidate a first build plane region using a first energy beam travelling along a first contour path, wherein the first contour path comprises a first outer contour portion and a first stitching portion, wherein the first outer contour portion at least partially defines a first edge portion of an outer edge of the three-dimensional object, and wherein the first edge portion is non-linear. The computer-executable instructions 910 may be further configured to cause the one or more processors 906 to consolidate a second build plane region of the three-dimensional object using a second energy beam travelling along a second contour path, wherein the second contour path at least partially defines a second edge portion of the outer edge of the three-dimensional object, and wherein the second edge portion is adjacent the first edge portion, and wherein, the first stitching portion extends into the second build plane region along a non-linear stitching path The memory devices 908 may store a plurality of data 912 accessible by the one or more processors 906. The data 912 may be past, current, real-time, or a combination thereof. The data 912 may be stored in a data library 914. As examples, the data 912 may include data 912 associated with or generated by an additive manufacturing system 100 and/or an additive manufacturing machine 102, including data 912 associated with or generated by a computing device 900, an additive manufacturing machine 102, a management system 106, and/or a user interface 108. The data 912 may also include other data sets, parameters, outputs, information, associated with an additive manufacturing system 100 and/or an additive manufacturing machine 102.

The one or more computing devices 900 may also include a communication interface 916 configured to communicate with various nodes on a communication network 918 via communication lines 920 that are wired or wireless. The communication interface 916 may include any suitable components for interfacing with one or more network(s), including for example, transmitters, receivers, ports, controllers, antennas, and/or other suitable components. The communication interface 916 may allow the one or more computing devices 900 to communicate with various nodes associated with the additive manufacturing machine 102, the management system 106, and/or a user interface 108. The communication network 918 may include, for example, a local area network (LAN), a wide area network (WAN), SATCOM network, VHF network, a HF network, a Wi-Fi network, a WiMAX network, a gatelink network, and/or any other communication network 918 for transmitting messages to and/or from the computing device 900 across the communication lines 920. The communication lines 920 of communication network 918 may include a data bus or a combination of wired and/or wireless communication links.

The management system 106 may include a server 922 and/or a data warehouse 924. As an example, at least a portion of the data 912 may be stored in the data warehouse 924, and the server 922 may be configured to transmit data 912 from the data warehouse 924 to the one or more computing device 900, and/or to receive data 912 from the one or more computing devices 900 and to store the received data 912 in the data warehouse 924 for further purposes. The server 922 and/or the data warehouse 924 may be implemented as part of the one or more computing devices 900 and/or as part of the management system 106.

While computer devices 900 and components thereof have been disclosed herein, it should be appreciated that these specific embodiments are not intended to be limiting and alternatives may further be realized within the scope of this disclosure.

It should now be appreciated that additive manufacturing systems and methods disclosed herein can assist in the proper alignment of energy beams to promote a smooth and consistent transition between a first build plane region 152a abuts a second build plane region 152b as they are consolidated using a first energy beam 134a and a second energy beam 134b, respectively. Such additive manufacturing systems and methods may particularly be utilized for three-dimensional objects 114 that have outer edges 153 that are non-linear such as by using a first stitching portion 194 that has a non-linear stitching path 200. They dynamic flexibility can provide for more tailored implementations in more complex objects when compared the easier to manufacture linear counterparts. Moreover, the additive manufacturing systems and methods disclosed herein enable or improve multi-laser builds by increasing part quality through the smoothening of transitions between adjacent hatching paths. Multi-laser systems incorporating the methods disclosed herein can operate at faster build speeds, using a greater number of lasers, or a combination thereof to build larger components at a faster rate.

Further aspects of the presently disclosed subject matter are provided by the following clauses:

A method of additively manufacturing a three-dimensional object by one or more energy beams, the method comprising selectively directing a first energy beam across a powder bed along a plurality of first hatching paths and a first contour path that defines a first outer contour portion and a first stitching portion, wherein the first outer contour portion at least partially defines a first edge portion of an outer edge of the three-dimensional object, and wherein the first edge portion is non-linear; and selectively directing a second energy beam across the powder bed along a plurality of second hatching paths and a second contour path that at least partially defines a second edge portion of the outer edge of the three-dimensional object, wherein the second edge portion is adjacent the first edge portion, and wherein the first stitching portion extends into the plurality of second hatching paths along a non-linear stitching path.

The method of any clause herein, wherein the non-linear stitching path comprises a partial representation of the outer edge rotated inwards into the three-dimensional object.

The method of any clause herein, wherein the second edge portion is non-linear.

The method of any clause herein, wherein the non-linear stitching path comprises a linear part and a curved part.

The method of any clause herein, wherein the second contour path comprises a second outer contour portion and a second stitching portion, wherein the second outer contour portion at least partially defines the second edge portion, and wherein the second stitching portion extends into the plurality of first hatching paths.

The method of any clause herein, wherein the non-linear stitching path moves away from the outer edge until a predetermined distance is obtained between an endpoint of the first stitching portion and a closest portion of the outer edge.

The method of any clause herein, wherein a parameter for the one or more energy beams varies between the first outer contour portion and the first stitching portion.

The method of any clause herein, wherein a power for the one or more energy beams is lower for the first stitching portion compared to the first outer contour portion.

The method of any clause herein, wherein the plurality of first hatching paths and the plurality of second hatching paths at least partially overlap to define an interlace region.

The method of any clause herein, wherein the first stitching portion of the first contour path is contained within the interlace region.

The method of any clause herein, wherein a first irradiation device generates the first energy beam and a second irradiation device generates the second energy beam.

The method of any clause herein, wherein directing the first energy beam across the powder bed along the plurality of first hatching paths occurs at least partially simultaneously with directing the second energy beam across the powder bed along the plurality of second hatching paths.

The method of any clause herein, wherein the first energy beam has at least one different beam parameter than the second energy beam.

The method of any clause herein, wherein at least one beam parameter of the first energy beam or the second energy beam is adjusted based on a temperature of the powder bed.

An additive manufacturing system for additively manufacturing a three-dimensional object according to any clause herein, the additive manufacturing system comprising a first irradiation device configured to generate the first energy beam; a first optical assembly configured to direct the first energy beam; a second irradiation device configured to generate the second energy beam; a second optical assembly configured to direct the second energy beam; and a control system configured to perform one or more control operations associated with the additive manufacturing system. The one or more control operations comprise selectively directing the first energy beam across the powder bed along the plurality of first hatching paths and the first contour path that defines the first outer contour portion and the first stitching portion, wherein the first outer contour portion at least partially defines the first edge portion of the outer edge of the three-dimensional object, and wherein the first edge portion is non-linear; and selectively directing the second energy beam across the powder bed along the plurality of second hatching paths and the second contour path that at least partially defines the second edge portion of the outer edge of the three-dimensional object, wherein the second edge portion is adjacent the first edge portion, and wherein the first stitching portion extends into the plurality of second hatching paths along the non-linear stitching path.

The additive manufacturing system of any clause herein, wherein the non-linear stitching path comprises a partial representation of the outer edge rotated inwards into the three-dimensional object.

The additive manufacturing system of any clause herein, wherein the second edge portion is non-linear.

A method of additively manufacturing a three-dimensional object by one or more energy beams, the method comprising generating a first energy beam from a first irradiation device; generating a second energy beam from a second irradiation device; selectively directing the first energy beam across a powder bed along a plurality of first hatching paths and a first contour path that defines a first outer contour portion and a first stitching portion, wherein the first outer contour portion at least partially defines a first edge portion of an outer edge of the three-dimensional object, and wherein the first edge portion is non-linear; and at least partially simultaneously with selectively directing the first energy beam across the powder bed, selectively directing the second energy beam across the powder bed along a plurality of second hatching paths and a second contour path that at least partially defines a second edge portion of the outer edge of the three-dimensional object, wherein the second edge portion is adjacent the first edge portion, and wherein the first stitching portion extends into the plurality of second hatching paths along a partial representation of the outer edge rotated inwards into the three-dimensional object.

The method of any clause herein, wherein the first energy beam has at least one different beam parameter than the second energy beam.

The method of any clause herein, wherein at least one beam parameter of the first energy beam or the second energy beam is adjusted based on a temperature of the powder bed.

A computer-readable medium comprising computer-executable instructions, which when executed by a processor associated with an additive manufacturing machine, causes the processor to perform a method comprising selectively directing a first energy beam across a powder bed along a plurality of first hatching paths and a first contour path that defines a first outer contour portion and a first stitching portion, wherein the first outer contour portion at least partially defines a first edge portion of an outer edge of the three-dimensional object, and wherein the first edge portion is non-linear; and selectively directing a second energy beam across the powder bed along a plurality of second hatching paths and a second contour path that at least partially defines a second edge portion of the outer edge of the three-dimensional object, wherein the second edge portion is adjacent the first edge portion, and wherein the first stitching portion extends into the plurality of second hatching paths along a non-linear stitching path.

The computer-readable medium of any clause herein, wherein the first energy beam has at least one different beam parameter than the second energy beam.

The computer-readable medium of any clause herein, wherein at least one beam parameter of the first energy beam or the second energy beam is adjusted based on a temperature of the powder bed.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of additively manufacturing a three-dimensional object by one or more energy beams, the method comprising:
    selectively directing a first energy beam across a powder bed along a plurality of first hatching paths and a first contour path that defines a first outer contour portion and a first stitching portion, wherein the first outer contour portion at least partially defines a first edge portion of an outer edge of the three-dimensional object, and wherein the first edge portion is non-linear; and
    selectively directing a second energy beam across the powder bed along a plurality of second hatching paths and a second contour path that at least partially defines a second edge portion of the outer edge of the three-dimensional object, wherein the second edge portion is adjacent the first edge portion, and wherein the first stitching portion extends into the plurality of second hatching paths along a non-linear stitching path.

2. The method of claim 1, wherein the non-linear stitching path comprises a partial representation of the outer edge rotated inwards into the three-dimensional object.

3. The method of claim 1, wherein the second edge portion is non-linear.

4. The method of claim 1, wherein the non-linear stitching path comprises a linear part and a curved part.

5. The method of claim 1, wherein the second contour path comprises a second outer contour portion and a second stitching portion, wherein the second outer contour portion at least partially defines the second edge portion, and wherein the second stitching portion extends into the plurality of first hatching paths.

6. The method of claim 1, wherein the non-linear stitching path moves away from the outer edge until a predetermined distance is obtained between an endpoint of the first stitching portion and a closest portion of the outer edge to the endpoint.

7. The method of claim 1, wherein a parameter for the one or more energy beams varies between the first outer contour portion and the first stitching portion.

8. The method of claim 7, wherein a power for the one or more energy beams is lower for the first stitching portion compared to the first outer contour portion.

9. The method of claim 1, wherein the plurality of first hatching paths and the plurality of second hatching paths at least partially overlap to define an interlace region.

10. The method of claim 9, wherein the first stitching portion of the first contour path is contained within the interlace region.

11. The method of claim 1, wherein a first irradiation device generates the first energy beam and a second irradiation device generates the second energy beam.

12. The method of claim 11, wherein directing the first energy beam across the powder bed along the plurality of first hatching paths occurs at least partially simultaneously with directing the second energy beam across the powder bed along the plurality of second hatching paths.

13. The method of claim 1, wherein the first energy beam has at least one different beam parameter than the second energy beam.

14. The method of claim 13, wherein at least one beam parameter of the first energy beam or the second energy beam is adjusted based on a temperature of the powder bed.

15. An additive manufacturing system for additively manufacturing a three-dimensional object according to the method of claim 1, the additive manufacturing system comprising:
    a first irradiation device configured to generate the first energy beam;
    a first optical assembly configured to direct the first energy beam;
    a second irradiation device configured to generate the second energy beam;
    a second optical assembly configured to direct the second energy beam; and
    a control system configured to perform one or more control operations associated with the additive manufacturing system, wherein the one or more control operations comprise:
        selectively directing the first energy beam across the powder bed along the plurality of first hatching paths and the first contour path that defines the first outer contour portion and the first stitching portion, wherein the first outer contour portion at least partially defines the first edge portion of the outer edge of the three-dimensional object, and wherein the first edge portion is non-linear; and
        selectively directing the second energy beam across the powder bed along the plurality of second hatching paths and the second contour path that at least partially defines the second edge portion of the outer edge of the three-dimensional object, wherein the second edge portion is adjacent the first edge portion, and wherein the first stitching portion extends into the plurality of second hatching paths along a non-linear stitching path.

16. The additive manufacturing system of claim 15, wherein the non-linear stitching path comprises a partial representation of the outer edge rotated inwards into the three-dimensional object.

17. The additive manufacturing system of claim 16, wherein the second edge portion is non-linear.

18. A method of additively manufacturing a three-dimensional object by one or more energy beams, the method comprising:
    generating a first energy beam from a first irradiation device;
    generating a second energy beam from a second irradiation device;
    selectively directing the first energy beam across a powder bed along a plurality of first hatching paths and a first contour path that defines a first outer contour portion and a first stitching portion, wherein the first outer contour portion at least partially defines a first edge portion of an outer edge of the three-dimensional object, and wherein the first edge portion is non-linear; and
    at least partially simultaneously with selectively directing the first energy beam across the powder bed, selectively directing the second energy beam across the powder bed along a plurality of second hatching paths and a second contour path that at least partially defines a second edge portion of the outer edge of the three-dimensional object, wherein the second edge portion is adjacent the first edge portion, and wherein the first stitching portion extends into the plurality of second hatching paths along a partial representation of the outer edge rotated inwards into the three-dimensional object.

19. The method of claim 18, wherein the first energy beam has at least one different beam parameter than the second energy beam.

20. The method of claim 19, wherein at least one beam parameter of the first energy beam or the second energy beam is adjusted based on a temperature of the powder bed.

* * * * *